United States Patent
Hwang et al.

(10) Patent No.: US 12,462,868 B2
(45) Date of Patent: Nov. 4, 2025

(54) SYSTEMS AND METHODS FOR IMPROVED DUAL-TAIL LATCH WITH LOAD CONTROL

(71) Applicant: Micron Technology, Inc., Boise, ID (US)

(72) Inventors: Jinha Hwang, Boise, ID (US); Won Joo Yun, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 174 days.

(21) Appl. No.: 18/506,208

(22) Filed: Nov. 10, 2023

(65) Prior Publication Data

US 2024/0249766 A1    Jul. 25, 2024

Related U.S. Application Data

(60) Provisional application No. 63/481,484, filed on Jan. 25, 2023.

(51) Int. Cl.
| | | |
|---|---|---|
| *G11C 7/06* | (2006.01) | |
| *G11C 11/4076* | (2006.01) | |
| *G11C 11/4091* | (2006.01) | |
| *G11C 11/4093* | (2006.01) | |

(52) U.S. Cl.
CPC ...... *G11C 11/4091* (2013.01); *G11C 11/4076* (2013.01); *G11C 11/4093* (2013.01)

(58) Field of Classification Search
CPC ............ G11C 11/4091; G11C 11/4076; G11C 11/4093
See application file for complete search history.

(56) References Cited

U.S. PATENT DOCUMENTS

| | | | |
|---|---|---|---|
| 11,037,607 B2* | 6/2021 | Chong | ................... H04L 7/0037 |
| 2015/0171793 A1* | 6/2015 | Regier | ...................... H03F 1/26 |
| | | | 330/251 |
| 2022/0157356 A1* | 5/2022 | Chae | ..................... G11C 7/1057 |

\* cited by examiner

*Primary Examiner* — Min Huang
(74) *Attorney, Agent, or Firm* — Fletcher Yoder, P.C.

(57) ABSTRACT

A semiconductor device includes an interface configured to receive clock signals and data signals. The interface includes a dual-tail latch. The dual-tail latch includes a sensing stage configured to sense and to amplify a differential voltage between at least a portion of the data signals and another signal. The sensing stage includes a first node and a second node between which the amplified differential voltage is output from the sensing stage. The dual-tail latch also includes a latch stage configured to latch a first latched value and a second latched value based at least in part on the amplified differential voltage. Moreover, the differential voltage is based at least in part on a previous first value and a previous second value from the latch stage fed back to the sensing stage.

18 Claims, 3 Drawing Sheets

SYSTEMS AND METHODS FOR IMPROVED DUAL-TAIL LATCH WITH LOAD CONTROL

CROSS-REFERENCE TO RELATED APPLICATIONS

This application claims priority to U.S. Application No. 63/481,484, filed Jan. 25, 2023, entitled "Systems and Methods for Improved Dual-Tail Latch with Load Control," which is incorporated by reference herein in its entirety for all purposes.

BACKGROUND

Field of the Present Disclosure

Embodiments of the present disclosure relate generally to the field of semiconductor devices. More specifically, embodiments of the present disclosure relate to dual-tail latches in a memory device.

Description of Related Art

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

Semiconductor devices (e.g., memory devices) may use a combination of one or more comparators or sensing stages and a latch stage (e.g., a dual-tail latch) to latch signals without additional electronic components. The dual-tail latch may be implemented with n-type input transistors or p-type input transistors, allowing for sensing of different voltage levels within a wide common mode range. However, as performance demands increase on semiconductor devices, especially using low voltages, the limits of the dual-tail latch performance may be insufficient without making changes to the dual-tail latch. That is, in certain applications, usage of traditional dual-tail latch architectures with greater performance demands may result in distortion of the data eye, reduced rank margining tool (RMT) margin and/or difficulties in decision feedback equalization (DFE) training. As such, systems implementing an improved dual-tail latch may be desired.

Embodiments of the present disclosure may be directed to address one or more of the problems set forth above.

BRIEF DESCRIPTION OF DRAWINGS

Various aspects of this disclosure may be better understood upon reading the following detailed description and upon reference to the drawings in which.

DETAILED DESCRIPTION

Figure 1:
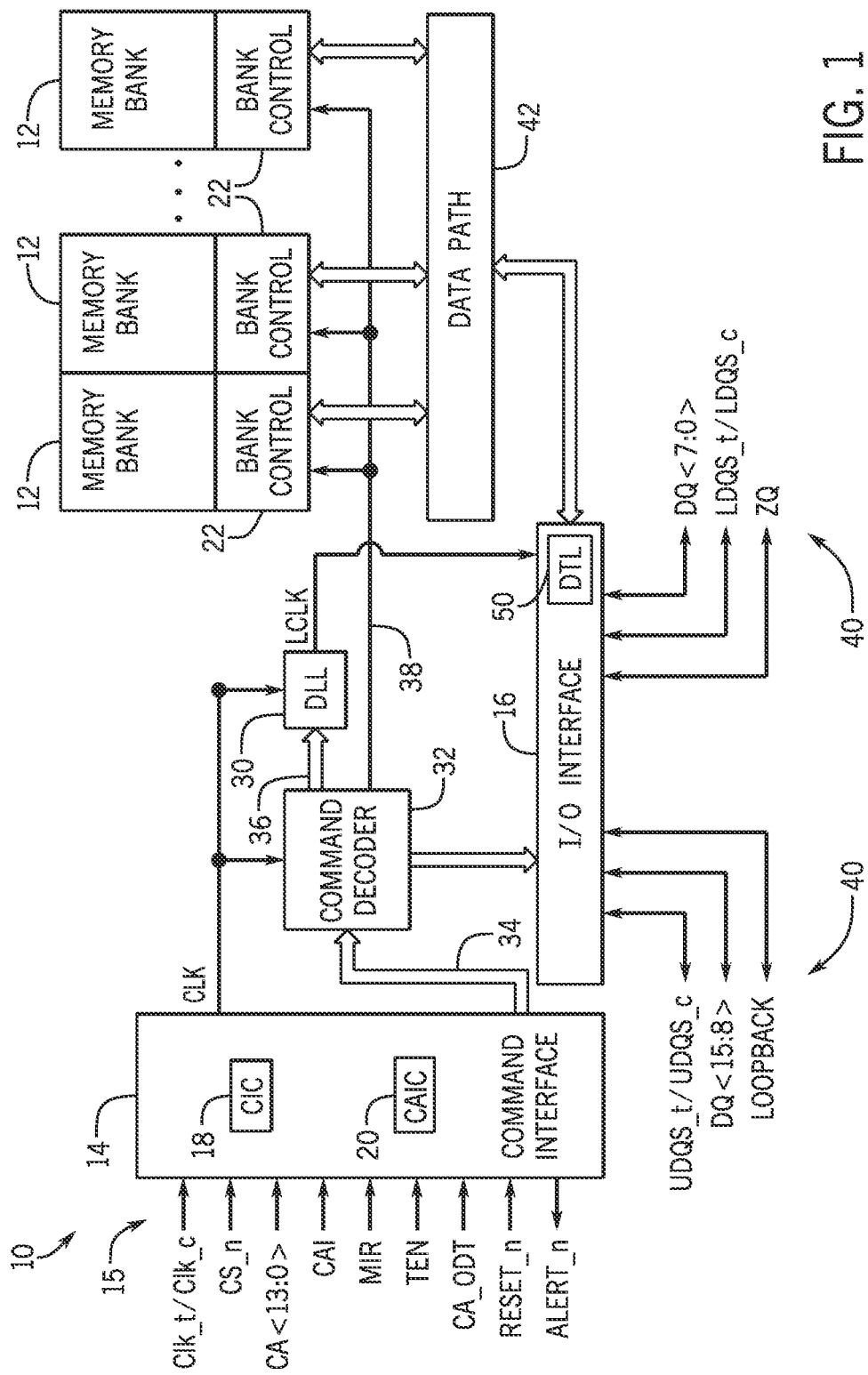
FIG. 1 is a simplified block diagram illustrating some features of a memory device having a dual-tail latch, according to an embodiment of the disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Memory devices receive signals having varying voltage levels during operation and may latch incoming signals within the receiver. Each signal may have a voltage level located in the common mode range, and each signal may be amplified to be processed in the memory device. To mitigate the need for additional electronic components (e.g., operational amplifiers), a dual-tail latch with one or more sensing stages, for comparing and amplifying input signals, and a latching stage, for latching the output signals from the sensing stage, may be implemented with input transistors of each stage having a common transistor type (e.g., either n-type transistors or p-type transistors) employed as input transistors in each stage.

However, due to timing constraints, semiconductor devices use higher frequencies with tighter margins. Thus, the dual-tail latch may encounter difficulties in reliably sensing and latching the inputs. Embodiments disclosed herein provide systems for implementing an improved first stage within the dual-tail latch with feedback from a latch output to ensure improved margins from an improved voltage differential between nodes in the improved first stage. The additional voltage differential may correspond to a larger eye opening potentially resulting in greater signal fidelity using the improved first stage rather than the traditional first stage with no feedback. Additionally, this larger voltage difference may result in an improvement in the development time (e.g., setup and hold time and/or voltage) in the dual-tail latch. The improved development time may provide an improvement in a rank margin tool (RMT) margin for the receiving data without adding additional power consumption due to no addition of current sources. This low-power consumption may enable the improved first stage to add improvements while still being capable of being used in memory devices that use low-power modes/systems. Accordingly, the first stage may be easily adapted/used in any memory applications, such low-power double-data rate devices (such as LPDDR4 or LPDDR5 devices), high bandwidth memory (HBM) devices, and/or other systems that may use sensing and latching systems (e.g., the dual-tail latch). The improved voltage difference may also overcome any potential performance degradation without making a large number of changes. Specifically, the improved first stage may be implemented by simply segmenting the transistors of traditional first stages into additional transistors while providing routing of the conventional outputs of the latching stage back to the transistors.

FIG. 1 is a simplified block diagram illustrating some features of a memory device 10. In accordance with one embodiment, the memory device 10 may be a double data rate type five synchronous dynamic random access memory (DDR5 SDRAM) device. Various features of DDR5 SDRAM allow for reduced power consumption, increased bandwidth, and increased storage capacity compared to prior generations of DDR SDRAM. The memory device 10 represents a portion of a single memory chip (e.g., SDRAM chip) having a number of memory banks 12. The memory banks 12 may be, for example, DDR5 SDRAM memory banks. The memory banks 12 may be disposed on one or more chips (e.g., SDRAM chips) arranged on dual inline memory modules (DIMMS). Each DIMM may include a number of SDRAM memory chips (e.g., eight or sixteen memory chips). Each SDRAM memory chip may include one or more memory banks 12.

For DDR5, the memory banks 12 may be arranged to form bank groups. For example, the memory chip may include sixteen memory banks 12 for an eight gigabyte (8 Gb) DDR5 SDRAM. The memory banks 12 may be arranged into eight memory bank groups, each memory bank group including two memory banks. For a sixteen gigabyte (16 Gb) DDR5 SDRAM, the memory chip may include thirty-two memory banks 12, arranged into eight memory bank groups, each memory bank group including four memory banks 12, for instance.

Various other configurations, organizations, and sizes of the memory banks 12 on the memory device 10 may be utilized depending on the application and design of the overall system. In one embodiment, each memory bank 12 includes a bank control block 22, which controls execution of commands to and from the memory banks 12 for performing various functionality in the memory device 10, such as decoding, timing control, data control, and any combination thereof.

A command interface 14 of the memory device 10 is configured to receive and transmit a number of signals (e.g., signals 15). The signals 15 may be received from an external device (not shown), such as a processor or controller. The processor or controller may provide various signals 15 to the memory device 10 to facilitate transmission and receipt of data to be written to or read from the memory device 10.

As will be appreciated, the command interface 14 may include a number of circuits, such as a clock input circuit 18 and a command address input circuit 20, for instance, to ensure proper handling of the signals 15. The command interface 14 may receive one or more clock signals from an external device. Generally, double data rate (DDR) memory utilizes a differential pair of system clock signals, referred to herein as the true clock signal (Clk_t) and the bar clock signal (Clk_c). A positive clock edge for DDR refers to the point where a rising true clock signal Clk_t crosses a falling bar clock signal Clk_c. A negative clock edge indicates a transition of a falling true clock signal Clk_t and a rising of the bar clock signal Clk_c. Commands (e.g., read command, write command, etc.) are typically entered on the positive edges of the clock signal. Data may be transmitted or received on both the positive and the negative clock edges.

The clock input circuit 18 receives the true clock signal (Clk_t) and the bar clock signal (Clk_c) and generates an internal clock signal, CLK. The internal clock signal CLK is supplied to an internal clock generator, such as a delay locked loop (DLL) circuit 30. The DLL circuit 30 generates a phase controlled internal clock signal LCLK based on the received internal clock signal CLK. The phase controlled internal clock signal LCLK is supplied to an I/O interface 16, for instance, and is used as a timing signal for determining an output timing of read data. In some embodiments, as discussed below, the clock input circuit 18 may include circuitry that splits the clock signal into multiple (e.g., four) phases. The clock input circuit 18 may also include phase detection circuitry to detect which phase receives a first pulse when sets of pulses occur too frequently to enable the clock input circuit 18 to reset between pulses.

The internal clock signal(s)/phases CLK may also be provided to various other components within the memory device 10 and may be used to generate various additional internal clock signals. For instance, the internal clock signal CLK may be provided to a command decoder 32. The command decoder 32 may receive command signals from the command bus 34 and may decode the command signals to provide various internal commands. For instance, the command decoder 32 may provide command signals to the DLL circuit 30 over the bus 36 to coordinate generation of the phase controlled internal clock signal LCLK. The phase controlled internal clock signal LCLK may be used to clock data through the I/O interface 16, for instance.

Further, the command decoder 32 may decode incoming commands, such as read commands, write commands, mode-register set commands, activate commands, etc., and provide access to a particular memory bank 12 corresponding to the command via the bus path 38. As will be appreciated, the memory device 10 may include various other decoders, such as row decoders and column decoders, to facilitate access to the memory banks 12.

The memory device 10 executes operations, such as read commands and write commands, based on the command/address signals received from an external device, such as a processor. In one embodiment, the command/address bus 34 may be a 14-bit bus to accommodate the command/address signals (CA<13:0>). The command/address signals 15 are clocked to the command interface 14 using the clock signals (Clk_t and Clk_c). The command interface 14 may include a command address input circuit 20 which is configured to receive and transmit the commands to provide access to the memory banks 12 through the command decoder 32. In addition, the command interface 14 may receive a chip select signal (CS_n). The CS_n signal enables the memory device 10 to process commands on the incoming CA<13:0> bus. Access to specific memory banks 12 within the memory device 10 is encoded on the CA<13:0> bus with the commands.

In addition, the command interface 14 may be configured to receive a number of other command signals. For instance, a command/address on die termination (CA_ODT) signal may be provided to facilitate proper impedance matching within the memory device 10. A reset command (RESET_n) may be used to reset the command interface 14, status registers, state machines and the like, during power-up for instance. The command interface 14 may also receive a command/address invert (CAI) signal which may be provided to invert the state of command/address signals CA<13:0> on the command/address bus 34, for instance, depending on the command/address routing for the particular memory device 10. A mirror (MIR) signal may also be provided to facilitate a mirror function. The MIR signal may be used to multiplex signals so the signals can be swapped to enable certain routing of signals to the memory device 10, based on the configuration of multiple memory devices (such as memory device 10) in a particular application.

Various signals to facilitate testing of the memory device 10, such as the test enable (TEN) signal, may be provided as well. For instance, the TEN signal may be used to place the memory device 10 into a test mode for connectivity testing.

The command interface 14 may also be used to provide an alert signal (ALERT_n) to the system processor or controller for errors that may be detected. For instance, the alert signal (ALERT_n) may be transmitted from the memory device 10 if a cyclic redundancy check (CRC) error is detected. Other alert signals may also be generated. Further, the bus and pin for transmitting the alert signal (ALERT_n) from the memory device 10 may be used as an input pin during some operations, such as the connectivity test mode executed using the TEN signal, as described above.

Data may be sent to and from the memory device 10, utilizing the command and clocking signals 15 discussed above, by transmitting and receiving data signals 40 through the I/O interface 16. More specifically, the data may be sent to or retrieved from the memory banks 12 over a datapath 42, which includes a plurality of bi-directional data buses. Data I/O signals, generally referred to as DQ signals, are generally transmitted and received in one or more bi-directional data busses. For particular memory devices, such as a DDR5 SDRAM memory device, the I/O signals may be divided into upper and lower bytes. For instance, for a ×16 memory device, the I/O signals may be divided into upper and lower I/O signals (e.g., DQ<15:8> and DQ<7:0>) corresponding to upper and lower bytes of the data signals, for instance.

To allow for higher data rates within the memory device 10, some memory devices, such as DDR memory devices may utilize data strobe signals, generally referred to as DQS signals. The DQS signals are driven by the external processor or controller sending the data (e.g., for a write command) or by the memory device 10 (e.g., for a read command). For read commands, the DQS signals are effectively additional data output (DQ) signals with a predetermined pattern. For write commands, the DQS signals may be used as clock signals to capture the corresponding input data. As with the clock signals (Clk_t and Clk_c), the DQS signals may be provided as a differential pair of data strobe signals (DQS_t and DQS_c) to provide differential pair signaling during reads and writes. For some memory devices, such as a DDR5 SDRAM memory device, the differential pairs of DQS signals may be divided into upper and lower data strobe signals (e.g., UDQS_t and UDQS_c, LDQS_t and LDQS_c) corresponding to upper and lower bytes of data sent to and from the memory device 10, for instance.

An impedance (ZQ) calibration signal may also be provided to the memory device 10 through the I/O interface 16. The ZQ calibration signal may be provided to a reference pin and used to tune output drivers and ODT values by adjusting pull-up and pull-down resistors of the memory device 10 across changes in process, voltage, and temperature (PVT) values. Because PVT characteristics may affect the ZQ resistor values, the ZQ calibration signal may be provided to the ZQ reference pin to be used to adjust the resistance to calibrate the input impedance to known values. As will be appreciated, a precision resistor is generally coupled between the ZQ pin on the memory device 10 and GND/VSS external to the memory device 10. This resistor acts as a reference for adjusting internal ODT and drive strength of the I/O pins.

In addition, a loopback signal (LOOPBACK) may be provided to the memory device 10 through the I/O interface 16. The loopback signal may be used during a test or debugging phase to set the memory device 10 into a mode wherein signals are looped back through the memory device 10 through the same pin. For instance, the loopback signal may be used to set the memory device 10 to test the data output (DQ) of the memory device 10. Loopback may include both a data and a strobe or possibly just a data pin. This is generally intended to be used to monitor the data captured by the memory device 10 at the I/O interface 16.

As will be appreciated, various other components such as power supply circuits (for receiving external VDD and VSS signals), mode registers (to define various modes of programmable operations and configurations), read/write amplifiers (to amplify signals during read/write operations), temperature sensors (for sensing temperatures of the memory device 10), etc., may also be incorporated into the memory device 10. Accordingly, it should be understood that the block diagram of FIG. 1 is provided to highlight some functional features of the memory device 10 to aid in the subsequent detailed description.

As discussed above, the memory device 10 may receive input signals at the I/O interface 16 to execute one or more commands. Before execution of the one or more commands based on the input signals, the memory device 10 may latch the input signals in the I/O interface 16. To latch the input signals, the memory device 10 may use a dual-tail latch 50 to sense/amplify and latch the input signals without the addition of other additional electronic components.

Figure 2:
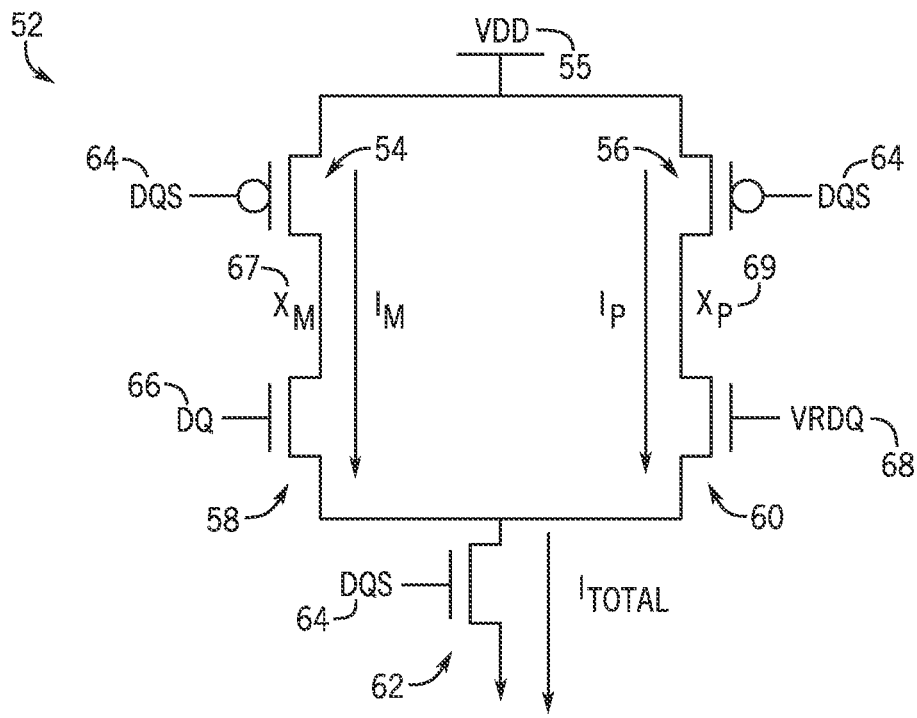
FIG. 2 is a circuit diagram of a first stage of the dual-tail latch of FIG. 1, according to an embodiment of the disclosure.

With the foregoing in mind, FIG. 2 is a circuit diagram of a first stage 52 of the dual-tail latch 50 with n-type input transistors. As previously noted, the dual-tail latch 50 may be located in the I/O interface 16 in the memory device 10, for instance. The dual-tail latch 50 may include first stage 52. The first stage 52 includes transistors (e.g., MOSFET transistors) 54, 56, 58, 60, and 62. In particular, the transistors 58 and 60 and the transistor 62 may be n-type transistors. Furthermore, the transistors 54 and 56 may be p-type transistors. A DQS input signal 64 (e.g., UDQS_t/LDQS_t) may be connected to a gate of the transistors 54, 56, and 62 to clock the signals received by the transistors 58 and 60 to sense and amplify one or more signals at the first stage 52. For instance, a DQ input signal 66 (e.g., DQ<15:8>/DQ<7:0>) may be connected to a gate of the transistor 58. A voltage reference (VRDQ) 68 may be connected to a gate of the transistor 60. Additionally, voltage source (VDD) 55 may be coupled to a source of the transistors 54 and 56. A total current ($I_{total}$) flowing through the transistor 62 is equal to a first current ($I_m$) flowing through the transistor 54 and the transistor 58 through an output node (Xm) 67 of the first stage 52 between them plus a second current ($I_p$) flowing through the transistor 56 and the transistor 60 through an output node (Xp) 69 of the first stage 52. Xm 67 and Xp 69 may be output from the first stage 52 to a second sensing stage after being developed by the DQS input signal 64.

When the DQS input signal 64 is low, the transistor 62 is off and the voltage at Xm 67 and Xp 69 is reset and pre-charged to VDD 55 through transistors 54 and 56. That is, the first stage 52 may be in a pre-charging phase when the DQS input signal 64 is low.

When the DQS input signal 64 is high, the first stage 52 may be in a develop mode. In the develop mode, the transistors 54 and 56 are turned off and the transistor 62 is turned on. The transistors 58 and 60 may be turned on by the DQ input signal 66 and the voltage reference 68, respectively. The transistors 58 and 60 draw a differential current proportional to the potential difference between the voltage of the DQ input signal 66 and the voltage reference 68. The differential current flow due to the discharge of voltage allows the differential voltage between the Xm 67 and Xp 69 to increase (e.g., differential gain) relative to the differential voltage between the DQ input signal 66 voltage and the voltage reference 68. That is, the differential voltage is amplified and discharges portions of the voltages at Xm 67 and Xp 69 to ground/VSS.

During the develop mode, a capacitive load at Xp 69 (Cload$_{Xp}$) may be discharged by the current I$_p$, and a capacitive load at Xm 67 (Cload$_{Xm}$) may be discharged by the current I$_m$. The capacitive load Cload$_{Xm}$ may be due to parasitic capacitance across terminals of the transistors 54 and 58 along with parasitic capacitances in a second stage coupled to Xm 67. Similarly, the capacitive load Cload$_{Xp}$ may be due to parasitic capacitance across terminals of the transistors 56 and 60 along with parasitic capacitances in a second stage coupled to Xp 69. Specifically, the voltage at Xm 67 may be defined using the following equation:

$$V_{Xm} = \frac{I_m * UI}{Cload_{Xm}}, \quad \text{(Equation 1)}$$

where V$_{xm}$ is the voltage at Xm 67 and UI is unit interval based on an operating frequency. Similarly, the voltage at Xp may be defined using the following equation:

$$V_{Xp} = \frac{I_p * UI}{Cload_{Xp}}, \quad \text{(Equation 2)}$$

where V$_{xp}$ is the voltage at Xp 69. Thus, the voltage difference (Vdiff) between V$_{xp}$ and V$_{xm}$ may be written as the following equation:

$$Vdiff = V_{Xp} - V_{Xm} = \frac{UI * (I_p - I_m)}{N}, \quad \text{(Equation 3)}$$

where N is equal to the Cload$_{Xp}$ and the Cload$_{Xm}$. The Vdiff may be inversely proportional to a propagation delay of the DQ input signal 66 through the double-tail latch 50.

Figure 3:
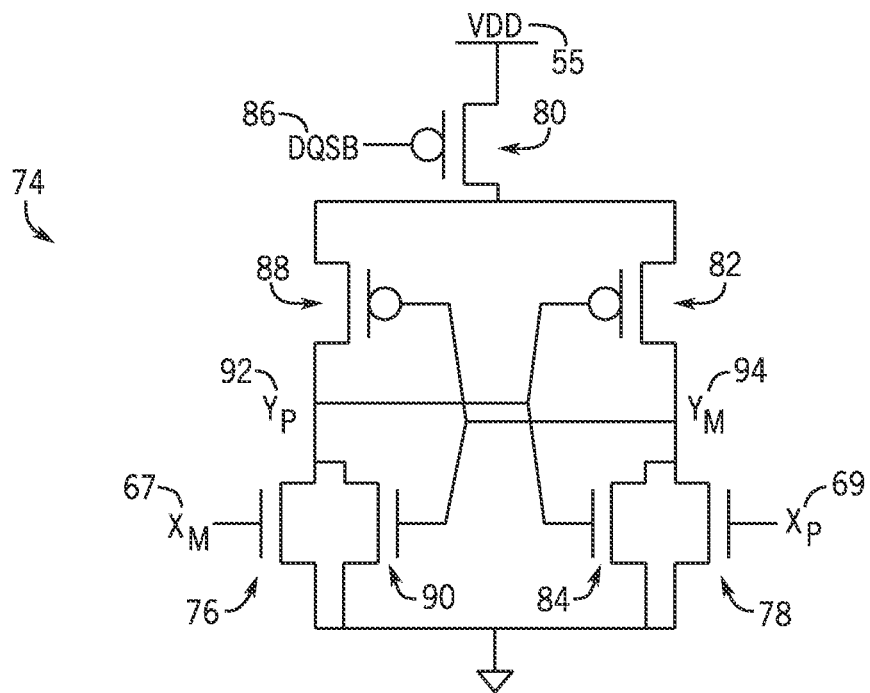
FIG. 3 is a circuit diagram of a second stage of the dual-tail latch of FIG. 1, according to an embodiment of the disclosure.

FIG. 3 shows a circuit diagram of a second stage 74 of the dual-tail latch 50. As illustrated, the second stage 74 includes transistors (e.g., MOSFET transistors) 76, 78, 80, 82, 84, 88, and 90. In particular, transistors 76, 78, 84, and 90 may be n-type transistors. Furthermore, transistors 80, 82, and 88 may be p-type transistors. A DQSB 86 may be an inverted data strobe signal (e.g., UDQS_c/LDQS_c) that is complimentary to the DQS input signal 64. DQSB 86 may be connected to a gate of the transistor 80. Additionally, VDD 55 may be coupled to a source of the transistor 80.

As Xm 67 and Xp 69 discharge due to the DQS input signal 64 transitioning high, the transistors 76 and 78 are switched off. This causes output nodes (Yp) 92 and (Ym) 94 to be precharged due to DQSB 86 being low when the DQS input signal 64 is high. As Xm 67 and Xp 69 charge due to the DQS input signal 64 transitioning low, the transistors 76 and 78 are switched on while the transistor 80 is switched off. Due to the differences in Xm 67 and Xp 69, the discharge of Yp 92 and Ym 94 may occur at different times/rates. Using this difference, the differential voltage is built up through the transistors 76 and 78 and passed to the transistors 82, 84, 88, and 90.

Figure 4:
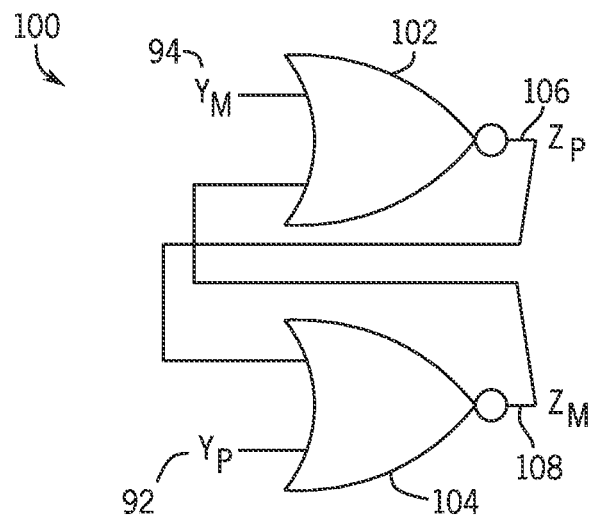
FIG. 4 is a circuit diagram of a third stage of the dual-tail latch of FIG. 1, according to an embodiment of the disclosure.

FIG. 4 shows a circuit diagram of a latching stage 100 that includes an SR flip-flop. The SR flip-flop may be implemented using NOR gates 102 and 104. The NOR gate 102 receives the Ym 94 and outputs Zp 106. The NOR gate 104 receives the Yp 92 and outputs the Zm 108. A critical timing point for the dual-tail latch 50, in terms of a data pattern, may be timing of the inversion of Zp 106 and Zm 108. As this timing point becomes tighter due to increased operating frequencies, the development time of the first stage 52 may need to be further improved.

Figure 5:
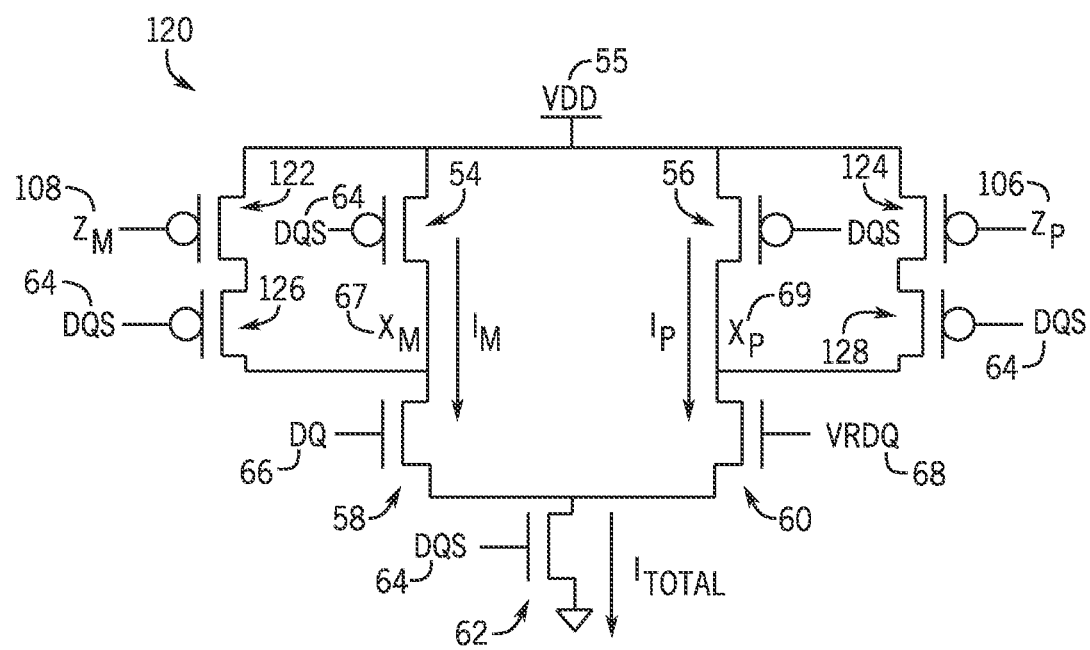
FIG. 5 is a circuit diagram of the first stage dual-tail latch of FIG. 1 having load control transistors, according to an embodiment of the disclosure.

FIG. 5 shows a circuit diagram with an improved first stage 120 for the dual-tail latch 50 that receives a feedback of Zp 106 and Zm 108 to increase the voltage differential in the first stage 52 for at least a worst data pattern where the DQ input signal 66 transitions (e.g., low to high). As illustrated, the improved first stage 120 is similar to the first stage 52 except that that the first stage 120 also includes transistors 122, 124, 126, and 128. Furthermore, in some embodiments, since charging of Xm 67 and Xp 69 occur through the transistors 54, 56, 122, 124, 126, and 128 rather than just through the transistors 54 and 56, the sizes of the transistors 54 and/or 56 may be downsized in the first stage 120 in comparison to their sizes in the first stage 52. As illustrated, the transistors 122, 124, 126, and 128 may be p-type transistors. The transistors 122 and 126 are coupled in series between VDD 55 and Xm 67. Similarly, the transistors 124 and 128 are coupled in series between VDD 55 and Xp 69. The gates of the transistors 126 and 128 are coupled to the DQS input signal 64 so that the connection to Xm 67 through the transistors 122 and 126 may only be on when the transistor 54 is on and that the connection to Xp 69 through the transistors 124 and 128 may only be on when the transistor 56 is on. The gate of the transistor 122 is coupled to Zm 108, and the gate of the transistor 124 is coupled to the Zp 106. The effective coupling of the transistors 122 and 126 in parallel with the transistor 54 provides a potential additional capacitive load at Xm 67 for DQ[n] based on previous data DQ[n−1]. Similarly, effective coupling of the transistors 124 and 128 in parallel with the transistor 56 provides a potential additional capacitive load at Xp 69 for DQ[n] based on previous data DQ[n−1]. V$_{xp}$ and V$_{xm}$ may still be calculated using Equations 1 and 2 above. However, Cload$_{Xp}$ and the Cload$_{Xm}$ may each change based on the previous value DQ[n−1]. For example, when Zp 106 is high and Zm 108 is low due to DQ[n−1], Cload$_{Xm}$ may be closer to N+1 rather than N while Cload$_{Xp}$ remains about N. Using these values of Cload$_{Xm}$ and Cload$_{Xp}$, the voltage difference between Xm 67 and Xp 69 may be determined using the following equation instead of using Equation 3:

$$Vdiff = V_{Xp} - V_{Xm} \approx \frac{UI * (I_p - I_m)}{N} + UI * (I_p - I_m). \quad \text{(Equation 4)}$$

Accordingly, the Vdiff for the first stage 120 is greater than the Vdiff for the first stage 52 as the Vdiff for the first stage 120 is approximately equal to the Vdiff for the first stage 52 plus an additional UI*(I$_p$−I$_m$).

The additional Vdiff may correspond to a larger eye opening potentially resulting in greater signal fidelity using the first stage 120 rather than the first stage 52. Additionally, this larger Vdiff may result in an improvement in the development time (e.g., setup and hold time and/or voltage) in the dual-tail latch 50. The improved development time may provide an improvement in a rank margin tool (RMT) margin for the receiving data without adding additional power consumption due to no addition of current sources. This low-power consumption may enable the first stage 120 to add improvements while still being capable of being used in memory devices that use low-power modes. Accordingly, the first stage 120 may be easily adapted/used in any memory applications, such low-power double-data rate devices (such as LPDDR4 or LPDDR5 devices), high bandwidth memory (HBM) devices, and/or other systems that may use sensing and latching systems (e.g., the dual-tail latch 50). The improved Vdiff may also overcome any potential performance degradation without making a large number of changes. Specifically, the first stage 120 may be implemented by simply segmenting the transistors 54 and 56 into additional transistors 122, 124, 126, and 128 while providing routing of the conventional outputs of the latching stage 100 back to the transistors 122 and 124.

While only certain features of the present disclosure have been illustrated and described herein, many modifications and changes will occur to those skilled in the art. For example, signal polarity for assertions may be inverted for at least some signals where a logic low is an assertion while a logic high is a de-assertion. It is, therefore, to be understood that the appended claims are intended to cover all such modifications and changes as fall within the true spirit of the embodiments described herein.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A semiconductor device comprising:
an interface configured to receive clock signals and data signals, wherein the interface comprises a dual-tail latch comprising:
a sensing stage configured to sense and to amplify a differential voltage between at least a portion of the data signals and another signal, wherein the sensing stage comprises:
a first node;
a second node, wherein the amplified differential voltage is output from the sensing stage via the first node and the second node;
a first transistor between the first node and a supply voltage;
a second transistor between the second node and the supply voltage;
a third transistor;
a fourth transistor, wherein the third and fourth transistors form a first path through the third and fourth transistors between the first node and the supply voltage;
a fifth transistor; and
a sixth transistor, wherein the fifth and sixth transistors form a second path through the fifth and sixth transistors between the second node and the supply voltage; and
a latch stage configured to latch a first latched value and a second latched value based at least in part on the amplified differential voltage, wherein the differential voltage is based at least in part on a previous first value and a previous second value from the latch stage fed back to the sensing stage.

2. The semiconductor device of claim 1, wherein the dual-tail latch comprises an additional sensing stage between the sensing stage and the latch stage to amplify the amplified differential voltage further before latching in the latch stage.

3. The semiconductor device of claim 1, wherein the clock signals comprises data strobe signals from a processor, and a change of the sensing stage between a precharge mode and a develop mode is based at least in part on the data strobe signals.

4. The semiconductor device of claim 1, wherein the data signals comprise data signals received from a processor coupled to the semiconductor device.

5. The semiconductor device of claim 1, wherein the other signal comprises a reference voltage for the semiconductor device.

6. The semiconductor device of claim 1, wherein the fourth transistor is configured to receive the previous first value at a gate of the fourth transistor, and the sixth transistor is configured to receive the previous second value at a gate of the sixth transistor.

7. The semiconductor device of claim 6, wherein the first, second, third, and fifth transistors are configured to receive the clock signals at respective gates of the first, second, third, and fifth transistors.

8. A memory device, comprising:
a plurality of memory cells; and
an input/output (I/O) interface configured to receive a data signal containing data for storage in the plurality of memory cells and to receive a data strobe signal to aid in capturing the data signal, wherein the I/O interface comprises:
a dual-sensing stage dual-tail latch, comprising:
a first sensing stage configured to sense a differential between the data signal and a reference signal and to provide a first differential output, wherein the first differential output is an amplification of the differential between the data signal and the reference signal;
a second sensing stage configured to receive the first differential output and to output a second differential output, wherein the second differential output comprises an additional amplification of the differential between the data signal and the reference signal beyond the amplification in the first sensing stage;
a latch stage configured to receive the second differential output, to latch the second differential output as a latched second differential output, and to output a first output and a second output based on the latched second differential output; and
a loopback path looping back the first output and the second output from the latch stage to the first sensing stage, wherein the first differential output is based at least in part on the loopback path.

9. The memory device of claim 8, wherein the reference signal comprises a reference voltage for the memory device.

10. The memory device of claim 8, wherein a current value for the first differential output is based at least in part on previous values of the first and second outputs fed back through the loopback path.

11. The memory device of claim 8, wherein the first sensing stage comprises:
a first node;
a second node, wherein the first differential output is output from the first and second nodes;

a first transistor between the first node and a supply voltage; and a second transistor between the second node and the supply voltage.

12. The memory device of claim 11, wherein the first sensing stage comprises:
a third transistor;
a fourth transistor, wherein the third and fourth transistors form a first path through the third and fourth transistors between the first node and the supply voltage, wherein the first path and the first transistor are connected in parallel between the supply voltage and the first node;
a fifth transistor; and
a sixth transistor, wherein the fifth and sixth transistors form a second path through the fifth and sixth transistors between the second node and the supply voltage, wherein the second path and the second transistor are connected in parallel between the supply voltage and the second node.

13. The memory device of claim 12, wherein the fourth transistor is configured to receive a first previous value of the first output at a gate of the fourth transistor for use in determining a first current value of the first output, and the sixth transistor is configured to receive a second previous value of the second output at a gate of the sixth transistor for use in determining a second current value of the second output.

14. The memory device of claim 13, wherein the first, second, third, and fifth transistors are configured to receive the data strobe signal at respective gates of the first, second, third, and fifth transistors.

15. A memory device, comprising:
a plurality of memory cells; and
an input/output (I/O) interface configured to receive a data signal containing data for storage in the plurality of memory cells and to receive a data strobe signal to aid in capturing the data signal, wherein the I/O interface comprises a dual-tail latch comprising:
a sensing stage, comprising:
a first transistor coupled between a first output node and a supply voltage;
a second transistor coupled between a second output node and the supply voltage, wherein the first and second output nodes are configured to output a differential voltage that is an amplification of a differential between the data signal and a reference voltage;
a third transistor;
a fourth transistor, wherein the third and fourth transistors are coupled in series between the first output node and the supply voltage, wherein the series-coupled third and fourth transistors are together connected in parallel to the first transistor between the supply voltage and the first output node;
a fifth transistor; and
a sixth transistor, wherein the fifth and sixth transistors are coupled in series between the second output node and the supply voltage, wherein the series-coupled fifth and sixth transistors are together connected in parallel to the second transistor between the supply voltage and the second output node;
a latch stage configured to latch a first value based at least in part on a first voltage at the first output node and a second value based at least in part on a second voltage at the second output node;
a first loopback path configured to feed back previous values of the first value to a gate of the third transistor for use in generating the differential voltage in the sensing stage; and
a second loopback path configured to feed back previous values of the second value to a gate of the fifth transistor for use in generating the differential voltage in the sensing stage.

16. The memory device of claim 15, wherein the first, second, fourth, and sixth transistors are configured to receive the data strobe signal at respective gates of the first, second, fourth, and sixth transistors.

17. The memory device of claim 16, wherein the dual-tail latch comprises a secondary sensing stage configured to receive the first voltage and the second voltage and is configured to amplify a differential in the differential voltage and transmit an amplified differential voltage to the latch stage, wherein the latched first value and the latched second value are based at least in part on the amplified differential voltage.

18. The memory device of claim 17, wherein secondary sensing stage comprises a seventh transistor that is coupled to the supply voltage and is configured to receive a complementary data strobe signal at its gate, wherein the complementary data strobe signal is complementary to the data strobe signal and is configured to at least partially control operation of the secondary sensing stage.

* * * * *